(12) United States Patent
Rekhif et al.

(10) Patent No.: US 6,344,223 B1
(45) Date of Patent: Feb. 5, 2002

(54) FOOD FORTIFIED WITH IRON

(75) Inventors: Nadji Rekhif, New Milford; Alexander Sher, Danbury; Dharam Vir Vadehra, New Milford; Elaine Regina Wedral, Sherman, all of CT (US)

(73) Assignee: Nestec S.A, Vevey (CH)

( * ) Notice: Subject to any disclaimer, the term of this patent is extended or adjusted under 35 U.S.C. 154(b) by 0 days.

(21) Appl. No.: 09/523,148

(22) Filed: Mar. 10, 2000

(51) Int. Cl.$^7$ ................................................ A23L 1/304
(52) U.S. Cl. ........................ 426/74; 426/593; 426/594; 424/439
(58) Field of Search ............................. 426/72, 73, 74, 426/593, 594; 424/439

(56) References Cited

U.S. PATENT DOCUMENTS

| | | | |
|---|---|---|---|
| 2,550,491 A | | 4/1951 | McDonald |
| 3,652,290 A | * | 3/1972 | Hammes et al. ............... 426/72 |
| 3,958,017 A | * | 5/1976 | Morse et al. .................. 426/72 |
| 4,214,996 A | * | 7/1980 | Buddemeyer et al. ......... 426/74 |
| 4,351,735 A | * | 9/1982 | Buddemeyer et al. .......... 252/1 |
| RE31,804 E | * | 1/1985 | Skoch et al. ................. 426/658 |
| 4,786,510 A | * | 11/1988 | Nakel et al. ................... 426/74 |
| 4,786,518 A | * | 11/1988 | Nakel et al. ................. 426/531 |
| 4,915,962 A | * | 4/1990 | Howard ........................ 426/74 |
| 4,931,292 A | * | 6/1990 | Torstensson et al. ........... 426/2 |
| 4,957,769 A | * | 9/1990 | Theuninck et al. ............ 426/74 |
| 4,992,282 A | * | 2/1991 | Mehansho et al. ............ 426/72 |
| 4,994,283 A | * | 2/1991 | Mehansho et al. ............ 426/74 |
| 5,002,779 A | * | 3/1991 | Mehansho et al. ............ 426/72 |
| 5,118,513 A | * | 6/1992 | Mehansho et al. ............. 426/2 |
| H1620 H | | 12/1996 | Dolan et al. ................ 426/593 |
| 5,613,465 A | * | 3/1997 | Moore ........................ 119/230 |
| 5,670,344 A | * | 9/1997 | Mehansho et al. ............ 426/74 |
| 5,888,563 A | | 3/1999 | Mehansho et al. ............ 426/72 |

FOREIGN PATENT DOCUMENTS

| | | |
|---|---|---|
| CA | 1032823 | 6/1978 |
| JP | 9-84522 | 3/1997 |
| JP | 9-205988 | 8/1997 |
| WO | WO 87 06433 | 11/1987 |
| WO | WO 97/27758 | 7/1997 |
| WO | WO 98 48648 | 11/1998 |
| WO | WO 0051447 | 9/2000 |

OTHER PUBLICATIONS

H.L Cross et al., Article on "Carbohydrate/iron interactions. Effect of carbohydrate oniron recognition taste, threshold values." Dep. of Food Tech., Univ. of Reading (1984), abstract.

* cited by examiner

Primary Examiner—Carolyn Paden
(74) Attorney, Agent, or Firm—Winston & Strawn

(57) ABSTRACT

A fortified foodstuff having a fortifying amount of an inorganic compound prepared from sources of ferrous or ferric iron, phosphate and ammonium. These compounds provide an iron fortification system which does not deleteriously affect organoleptic properties of the foodstuff, and which is particularly useful for products containing polyphenols (cocoa, tea, etc.), or which have a high fat content.

26 Claims, No Drawings

FOOD FORTIFIED WITH IRON

FIELD OF THE INVENTION

The present invention relates to the fortification of food and more particularly to the fortification of food with iron.

BACKGROUND OF THE INVENTION

Iron is an essential trace element in animal and human nutrition. It is a component of heme in hemoglobin and of myoglobin, cytochromes and several enzymes. The main role of iron is its participation in the transport, storage and utilization of oxygen.

Deficiency of iron was and remains a common nutritional problem not only in the developing but also in the industrialized countries. Inadequate intake of dietary iron causes the high incidence of anaemia which nutritional surveys have identified among children, adolescents and women. Since the body does not produce minerals, it is totally dependent on an external supply of iron, either nutritional or supplementary. The importance of adequate iron intake is recognized during the whole life of the human being. The recommended daily allowance for iron intake is from 10 to 18 mg per day, and is dependent on age and sex. Children, women up to the time of menopause, and expectant and nursing mothers are in the group with higher requirements of iron.

Iron in the form of a salt or complex can be added to food and/or beverages to provide the daily allowance. The main problems caused by iron sources added to food and beverages are color and off-flavor production, especially in the presence of oxygen, light and at high temperature. Moreover, the addition of iron to beverages, especially to tea, chocolate milk or banana containing drinks, can be very difficult. If highly or slightly soluble sources of iron are used, interaction between the iron and iron sensitive ingredients, such as polyphenols, occurs. Thus, the addition of ferrous sulfate or other soluble iron salts such as ferric sulfate, ferrous lactate, ferrous gluconate, ferrous fumarate, ferric citrate, ferric choline citrate, ferric ammonium citrate, etc., cause chocolate powders and other RTD (ready-to-drink) mixes to turn dark grey when reconstituted with water or milk.

Another problem in iron fortification is the capacity of iron to promote destructive free-radical reactions, which can result in off-flavors. Thus, the addition of soluble iron sources to fat containing products—mostly products with a high level of unsaturated fatty acids—cause flavor changes due to lipid oxidation. Iron promoted oxidation not only affects the organoleptic properties of foods and beverages, but also undesirably affects the nutritional quality of these products. These interactions can be also enhanced during heat treatment, such as pasteurization or sterilization.

As alternatives to the soluble sources of iron, which are highly bioavailable but lead to an undesirable flavor and/or color, insoluble iron sources such as elemental iron, ferric pyrophosphate, etc. may be used. These forms of iron cause little or no discoloration and off-flavor problems but are poorly bioavailable.

Furthermore, it is well recognized that ferrous compounds in general are more bioavailable than ferric. This correlates with higher solubility of ferrous compared to ferric salts at physiological pH, as well as with lower affinity of Fe(II) to form complexes.

U.S. Pat. No. 4,020,158 describes a method of raising the levels of essential bivalent metals in the tissue of animals which comprises the administration to animals of exogenously synthesized metal proteinates by dissolving metal salts in aqueous solutions of protein hydrolysates and adding sufficient base to pH between about 7.5 and 10 to precipitate the metal proteinates. According to the patent only soy protein as source of protein was used to obtain protein hydrolysate (by heating soy protein in hydrochloric acid solution at 130° C. for 4 hours). Using the complex prepared by this method led to product discoloration when chocolate powders were reconstituted with cold/hot water or milk, indicating weak or incomplete complex formation.

U.S. Pat. No. 4,216,144 describes an iron proteinate coordination complex with at least three protein hydrolysate ligands selected from the group consisting of polypeptides, peptides and naturally occurring amino acids. The iron proteinate has been shown by analysis to be at least 70 to 80 percent chelated. Therefore, because of 20 to 30% of free iron, the patented chelate can not prevent discoloration and off-flavor development, particularly when it is used to fortify polyphenol or other fat containing products, such as cocoa, coffee, tea, banana, etc. Thus, improvements in this area are needed.

SUMMARY OF THE INVENTION

We now have developed an iron fortification system which does not deleteriously affect organoleptic properties, and which is particularly useful for products containing polyphenols (cocoa, tea, etc.), or which have a high fat content. This iron fortification system comprises compounds prepared from sources of ferrous or ferric iron, phosphates, and ammonium. Such compounds, on the one hand, possess strong iron-ligand bonds which prevent reactivity of free iron and, on the other hand, dissociate at the acidic stomach media to provide high bioavailability of iron.

Accordingly, the present invention provides a fortified foodstuff comprising a fortifying amount of an inorganic compound prepared from sources of ferrous or ferric iron, phosphate and ammonium.

DETAILED DESCRIPTION OF THE INVENTION

Advantageously, the foodstuff which is to be fortified with iron is a food or beverage, particularly a food or beverage that is sensitive to oxidation, off-flavor development, or discoloration in the presence of free iron.

The foodstuff may be a dairy-based product such as a milk cocoa containing beverage, a liquid nutritional product or other beverages such as a juice, or it may be a powdery product, e.g., instant coffee, cocoa containing mixtures (e.g, MILO, NESQUIK, etc.) liquid formulae, and the like.

The developed ferrous and ferric compound also work well in fortified products containing iron-sensitive components, such as polyphenols, unsaturated fatty acids, etc.

The amount of iron provided in the food or beverage may be from 1 to 200 ppm, preferably from 5 to 100 ppm and more preferably from 10 to 75 ppm.

The iron ferrous source that can be used to create these compounds can include any food grade ferrous salt, such as ferrous sulfate, ferrous ammonium sulfate, ferrous chloride, ferrous malate, ferrous acetate, ferrous gluconate, ferrous nitrate, ferrous lactate, ferrous fumarate, ferrous succinate, and ferrous oxide, ferrous hydroxide or mixture thereof. The most preferred material is ferrous sulfate.

The iron ferric source that can be used to create these compounds can include any food grade ferric salt, such as ferric sulfate, ferric chloride, ferric nitrate, ferric acetate, ferric malate, ferric ammonium acetate, ferric formate, ferric oxide, ferric hydroxide or mixture thereof. The most preferred of these is ferric sulfate.

Elemental iron also can be used as iron source to create these compounds.

The source of phosphates that can be used to create these compounds can include any food grade orthophosphate salt, such as mono-, di or tri-sodium, potassium, ammonium, magnesium or calcium phosphates, as well as phosphoric acid, or mixture thereof. Preferably, phosphoric acid is used.

The source of ammonium that can be used to create these compounds can include any food grade ammonium source, such as ammonia water, ammonium hydroxide, ammonium acetate, ammonium bicarbonate, ammonium carbamate, ammonium carbonate, ammonium chloride, ammonium lactate, ammonium sulfate, ammonium ferrous sulfate, ammonium ferric sulfate, ammonium nitrate, mono-, and di-basic ammonium phosphates, or mixture thereof. Preferably, ammonium hydroxide is used.

The inorganic compounds, which are the object of this invention, may conveniently be formed by the interaction of a suitable iron source (II or III) with a suitable source of phosphates (phosphoric acid or phosphate salt with any of the abovementioned acids), and then with any suitable source of ammonia. For example, the inorganic compounds may be formed by the interaction of a suitable iron source (II or III) with a suitable source of phosphates under acid conditions and then adjustment of the pH of the compounds with any suitable source of ammonia. The acid that can be used to create these compounds is not limited and may be any of a number of food grade inorganic or organic acids such as phosphoric, hydrochloric, sulfuric, acetic, lactic, malic, nitric, fumaric, gluconic, succinic, ascorbic or mixture thereof. The most preferred acid is phosphoric acid.

Most preferably, the compounds may be prepared by combining ferrous or ferric sulfate with phosphoric acid under agitation, and then adjusting pH to about 5.5–9 by addition of ammonium hydroxide. The preferable pH range is about 6–7.5, and the most preferred is 6.5–7. The weight ratio between the iron, ammonia, and phosphate groups may be 1: (0.2–5): (0.4–10), preferably 1: (0.6–3): (2.5–8.5), and most prefer 1: (0.8–1.75): (3.5–5).

In the presence of the essential amount of ammonia, a food grade alkaline agent may be used for pH adjustment, including but not limited to sodium hydroxide, potassium hydroxide, ammonia hydroxide, magnesium hydroxide, sodium carbonate, sodium bicarbonate, potassium carbonate, potassium bicarbonate or mixture thereof.

Advantageously, the iron containing compound may be added to the foodstuff in a form of an aqueous dispersion or as a dry powder.

The inorganic compound prepared from sources of ferrous or ferric iron, phosphate and ammonium may be used to fortify beverages and foods giving improved palatability without affecting product quality.

The preferred iron compound is the ferrous compound which not only possesses strong functional properties similar to the ferric compound in preventing iron reactivity, but also has very high free iron release at stomach pH (i.e., close to that of ferrous sulfate), so its high bioavailability can be achieved. The ferrous compound has good functionality to prevent discoloration, off-flavor, and fat oxidation, together with high iron release at stomach pH.

Based on analytical data of elemental (Fe, N, P) analyses and ionic HPLC, the chemical formula of the inorganic ferrous compound formed by the interaction of ferrous, phosphates and ammonium sources was determined as $FeNH_4PO_4$. The level of the iron load in the compound was determined to be very high (30–32%). These compounds can be dried by means known to those skilled in the art. This can include filtration, freeze or spray drying. The dried products are readily dispersible in water.

The fortified foodstuff comprising a fortifying amount of ferrous ammonium phosphate may be prepared by forming this inorganic compound and by adding the compound to the foodstuff. The foodstuff can then be heat-treated by normal means without any loss in quality such as discoloration, lipid oxidation, or fouling of processing equipment. The resulting fortified foodstuff is similar to its non-fortified counterpart in organoleptic quality such as flavor, aroma, color, texture, viscosity or mouthfeel.

The invention provides the following improvements and advantages.

1) the ferrous and ferric ammonium phosphate compounds are very effective in fortifying food and beverages, particularly those containing polyphenols and/or unsaturated fat, which are sensitive to discoloration and off-flavor development in the presence of free iron.
2) the compounds are easy to produce.
3) the level of iron load in the compounds is very high, e.g., 30–32%, for ferrous ammonium phosphate.
4) due to rapid and high iron release at stomach conditions (at a pH of between 2 and 3.5), the good bioavailability of ferrous ammonium phosphate could be assumed.
5) no allergenicity of the ferrous and ferric ammonium phosphate compounds could be assumed due to their inorganic nature.

EXAMPLES

The following examples further illustrate the present invention. Parts and percentages are given by weight unless otherwise stated.

Example 1
Preparation of Inorganic Iron Compound 58 grams of phosphoric acid (85%) was dissolved in 1 liter of distilled water. Ferrous sulfate heptahydrate was added (56 g) and then pH was adjusted to 6.8 with ammonium hydroxide (28%). Precipitates, formed during neutralization, were separated by filtration (Whatman, 42), then carefully washed with de-ionized water and dried under air at room temperature.

Example 2
Preparation of Inorganic Iron Compound with Different Order of Ingredient Addition 58 grams of phosphoric acid (85%) was dissolved in 1 liter of distilled water. Ferrous sulfate heptahydrate was added (56 g) and then pH was adjusted to 6.8 with ammonium hydroxide (28%). Precipitates, formed during neutralization, were separated by filtration (Whatman, 42), then carefully washed with de-ionized water and dried under air at room temperature.

Example 3
Preparation of Inorganic Iron Compound in Spray Dried Form 58 grams of phosphoric acid (85%) was dissolved in 1 liter of distilled water. Ferrous sulfate heptahydrate was added (56 g) and then pH was adjusted to 6.8 with ammonium hydroxide (28%). The liquid was spray dried using atomizing spinning disk spray-drier ($T_{in}$=145 C., $T_{out}$=80 C.).

Example 4
MILO and NESQUIK Powder Fortification.

Iron compounds (ferrous ammonium phosphate) from Examples 1, 2 and 3 were added to 22.0 g of MILO powder (a commercial product sold by Nestle whose ingredients are sugar, skimmed milk powder, glucose syrup, palm fat, cocoa and permitted food conditioner) and NESQUIK powder (a commercial powdered chocolate flavor sold by Nestle whose ingredients are sugar, cocoa, soy lecithin, salt, artificial and natural flavor). These chocolate powders were then reconstituted with 180 ml of boiling water or milk, respectively (15.0 ppm final iron concentration). Products were stirred briefly and allowed to stand for 15 minutes at room temperature. After 15 minutes, products were judged by a taste panel of 10 people.

The results of the effect of iron fortification are presented in Table 1. It has been found that the ferrous compound diminishes cocoa discoloration when iron fortified (15 ppm) NESQUIK powder was reconstituted with boiling water or milk. Color changes presented by its total color difference, DE, are shown in Table 1, where DE is calculated from the Hunter equation:

$$\Delta E = \sqrt{(L_i - L_{control})^2 + (a_i - a_{control})^2 + (b_i - b_{control})^2}$$

Thus, as shown in Table 1, minor color changes were determined in MILO or NESQUIK powders that were fortified with the novel ferrous compound as compared to products fortified with ferrous sulfate, which produced a significant color change. Significantly less differences were observed when reconstituted with cold water or milk. The iron fortified NESQUIK powder reconstituted with boiling milk and MILO powder reconstituted with boiling water were judged by 10 panelists. No off-flavor and visual performance were found in NESQUIK and MILO samples fortified with the novel ferrous or ferric inorganic compound as compared to the control without added iron.

TABLE 1

Effect of iron fortification on discoloration of cocoa containing products

| additive | MILO powder (ΔE) | NESQUIK powder (ΔE) |
|---|---|---|
| $FeHN_4PO_4$ | 1.1 | 1.5 |
| commercial $Fe(PO_4)_2$ | 1.1 | 1.4 |
| $FeSO_4$ | 10.5 | 10.3 |
| control (no additive) | 0.2 | 0.2 |

Example 5
MILO Powder Beverage Fortification

Iron compound from Examples 1, 2 and 3 were added to chocolate milk (8.5% MILO powder, 15 ppm total iron). Iron fortified MILO chocolate milk was autoclaved at 121° C. for 5 min in 125 ml glass jars, closed and cooled to room temperature. Autoclaved and Ultra high temperature ("UHT") sterilized samples were evaluated for color and taste after 1 month storage at ambient temperature. No color changes and off flavors were found when samples were compared to control samples without added iron, while samples fortified with ferrous sulfate turned dark gray and had off-flavor.

Example 6
Lipid Oxidation

Fish oil contains a substantial amount of polyunsaturated fatty acids, which make it highly susceptible to oxidation. It is known that binding of free iron reduces iron pro-oxidant activity. To prove this, the extent of lipid oxidation and induction time thereof was measured by conductivity changes using a Metrohm Rancimat, model 617.

Ferrous ammonium phosphate was added to fish oil. The same amount of iron, as ferrous sulfate, was also added to a second sample of fish oil. Both samples along with a control sample (without added iron), were heated at 100 C. and induction time was determined using the Rancimat. No difference in oxidation induction time was found between the fish oil fortified with ferrous ammonium phosphate and the control sample without added iron. However, induction time of fish oil fortified with ferrous sulfate was about 50–60% less than the other two samples. Therefore, the results of a rancidity test (see Table 2) showed that the presence of 50 ppm ferrous ammonium phosphate $FeHN_4PO_4$, prevents fish oil oxidation caused by iron.

To compare, the induction time for fish oil fortified with ferric sulfate was about 60% less than the control (i.e., no additive). Similar results to ferrous ammonium phosphate were obtained for ferric ammonium phosphate.

Further, no lipid oxidation as compared to control with no added iron was found by measuring hexanal level in headspace of instant liquid formula samples fortified with ferrous ammonium phosphate (50 ppm iron) after incubation for 3 days at 60 C. However, a high hexanal level of 3.5 ppm was detected in ferrous sulfate containing sample, indicating lipid oxidation in the product (see Table 2).

TABLE 2

Effect of iron fortification on lipid oxidation

| additive | induction time (hr.) | hexanal measured (ppb) |
|---|---|---|
| $FeHN_4PO_4$ | 6.1 | 30 |
| commercial $Fe(PO_4)_2$ | 6.0 | 32 |
| $FeSO_4$ | 2.5 | 3500 |
| control (no additive) | 6.0 | 40 |

Example 7

To estimate the bioavailability of ferrous ammonium sulfate ($FeHN_4PO_4$) the iron release at conditions similar to the adult and infant stomach (37 C., pH=2.0 and 3.5 by HCl, respectively) were determined. Rapid and high iron release (90 to 100% of the total iron) were observed at both pH 2 and pH 3.5.

What is claimed is:

1. A fortified foodstuff comprising a foodstuff food or beverage and a fortifying amount of an inorganic compound prepared from sources of ferrous iron, phosphorous and ammonium.

2. A fortified foodstuff according to claim 1 wherein the foodstuff which is fortified is a food or beverage that is sensitive to oxidation, off-flavor development, or discoloration in the presence of free iron.

3. A fortified foodstuff according to claim 1 wherein the foodstuff which is fortified is a milk cocoa containing beverage, a liquid nutritional product, a juice, or a powdery product.

4. A fortified foodstuff according to claim 1 wherein the foodstuff which is fortified is instant coffee, a cocoa containing mixture, or a liquid formula in powdered form.

5. A fortified foodstuff according to claim 1 wherein the fortifying amount of iron in the food or beverage is from about 1 to 200 ppm.

6. A fortified foodstuff according to claim 1 wherein the iron ferrous source used to create the inorganic compound is ferrous sulfate, ferrous ammonium sulfate, ferrous chloride, ferrous acetate, ferrous malate, ferrous citrate, ferrous gluconate, ferrous nitrate, ferrous lactate, ferrous fumarate, ferrous succinate, ferrous oxide, ferrous hydroxide or a mixture thereof.

7. A fortified foodstuff according to claim 1 wherein the iron source used to create the inorganic compound is elemental iron.

8. A fortified foodstuff according to claim 1 wherein the source of phosphate used to create the inorganic compound is mono-, di or tri-sodium, potassium, ammonium, magnesium or calcium phosphate, phosphoric acid, or a mixture thereof.

9. A fortified foodstuff according to claim 1 wherein the source of ammonium used to create the inorganic compound is ammonia water, ammonium hydroxide, ammonium acetate, ammonium bicarbonate, ammonium carbamate, ammonium carbonate, ammonium chloride, ammonium lactate, ammonium sulfate, ammonium ferrous sulfate, ammonium nitrate, mono- and di- basic ammonium phosphates, or a mixture thereof.

10. A fortified foodstuff according to claim 1 wherein the inorganic compound is formed by the interaction of a suitable iron source (II) with a suitable source of phosphates and with any suitable source of ammonia.

11. A fortified foodstuff according to claim 10 wherein the weight ratio between the iron, ammonia, phosphate groups of the compounds is 1:(0.2–5):(0.4–10).

12. A fortified foodstuff according to claim 10 wherein the inorganic compound is $FeNH_4PO_4$.

13. A fortified foodstuff according to claim 10 wherein, in the presence of ammonia, pH adjustment of the inorganic compound is carried out by adding sodium hydroxide, potassium hydroxide, ammonia hydroxide, magnesium hydroxide, sodium carbonate, sodium bicarbonate, potassium carbonate, potassium bicarbonate or a mixture thereof.

14. A fortified foodstuff according to claim 1 wherein the inorganic compound is formed by the interaction of a suitable iron source (II) with a suitable source of phosphates under acid conditions and the adjustment of the pH of the compounds with any suitable source of ammonia.

15. A fortified foodstuff according to claim 14 wherein the acid used to create the inorganic compound is phosphoric, hydrochloric, sulfuric, acetic, lactic, malic, citric, nitric, fumaric, gluconic, succinic, ascorbic or a mixture thereof.

16. A fortified foodstuff according to claim 14 wherein the inorganic compound is prepared by combining ferrous sulfate with phosphoric acid under agitation, and then adjusting pH to 5.5–9 by addition of ammonium hydroxide.

17. A fortified foodstuff according to claim 1 wherein the inorganic compound is provided in dry form by filtration, freeze or spray drying.

18. A process of preparing a fortified foodstuff according to claim 1 which comprises adding the compound to the foodstuff in a form of an aqueous suspension or as a dry powder.

19. A process of preparing a fortified foodstuff according to claim 18 further comprising forming the inorganic compound by interacting a suitable iron source (II) with a suitable source of phosphates and with any suitable source of ammonia.

20. A process of preparing a fortified foodstuff according to claim 19 further comprising forming the inorganic compound by interacting a suitable iron source (II) with a suitable source of phosphates under acid conditions and then adjusting of the pH of the compound with any suitable source of ammonia.

21. A fortified foodstuff comprising a foodstuff food or beverage and a fortifying amount of an inorganic compound prepared from sources of ferric iron, phosphate and ammonium, wherein the inorganic compound comprises a weight ratio between iron, ammonia and phosphate groups of about 1:(0.8–1.75):(3.5–5).

22. A fortified foodstuff according to claim 21 wherein the iron ferric source used to create the inorganic compound is ferric sulfate, ferric chloride, ferric nitrate, ferric acetate, ferric ammonium acetate, ferric formate, ferric oxide, ferric hydroxide or a mixture thereof.

23. A fortified foodstuff according to claim 21 wherein the inorganic compound is formed by the interaction of a suitable iron source (III) with a suitable source of phosphates and with any suitable source of ammonia.

24. A fortified foodstuff according to claim 21 wherein the inorganic compound is formed by the interaction of a suitable iron source (III) with a suitable source of phosphates under acid conditions and the adjustment of the pH of the compounds with any suitable source of ammonia.

25. A fortified foodstuff according to claim 21 wherein the fortifying amount of iron in the food or beverage is from about 1 to about 200 ppm.

26. A fortified foodstuff comprising a fortifying amount of an inorganic compound prepared from sources of ferrous or ferric iron, phosphate and ammonium, wherein the foodstuff which is fortified is a milk cocoa and/or coffee containing beverage, a liquid nutritional product, a juice, or a powdery product, said liquid nutritional product and said powdery product comprising coffee and/or cocoa.

* * * * *

UNITED STATES PATENT AND TRADEMARK OFFICE
CERTIFICATE OF CORRECTION

PATENT NO.   : 6,344,223 B1
DATED         : February 5, 2002
INVENTOR(S)  : Rekhif et al.

It is certified that error appears in the above-identified patent and that said Letters Patent is hereby corrected as shown below:

<u>Title page,</u>
Item [73], Assignee, change "S.A," to -- S.A., --; and <u>Column 8,</u>
Line 16, change "claim 19" to -- claim 18 --.

Signed and Sealed this

Twenty-fourth Day of September, 2002

*Attest:*

JAMES E. ROGAN
*Attesting Officer*  *Director of the United States Patent and Trademark Office*